(12) United States Patent
Jonishi et al.

(10) Patent No.: US 9,535,170 B2
(45) Date of Patent: Jan. 3, 2017

(54) SCINTILLATOR PANEL AND RADIATION DETECTOR

(71) Applicant: HAMAMATSU PHOTONICS K.K., Hamamatsu-shi, Shizuoka (JP)

(72) Inventors: Hidenori Jonishi, Hamamatsu (JP); Munenori Shikida, Hamamatsu (JP); Yutaka Kusuyama, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 14/414,986

(22) PCT Filed: Apr. 18, 2013

(86) PCT No.: PCT/JP2013/061491
§ 371 (c)(1),
(2) Date: Jan. 15, 2015

(87) PCT Pub. No.: WO2014/013770
PCT Pub. Date: Jan. 23, 2014

(65) Prior Publication Data
US 2015/0204985 A1 Jul. 23, 2015

(30) Foreign Application Priority Data
Jul. 20, 2012 (JP) .................. 2012-161766

(51) Int. Cl.
*G01T 1/20* (2006.01)
*G21K 4/00* (2006.01)
*G01T 1/202* (2006.01)

(52) U.S. Cl.
CPC ............ *G01T 1/2006* (2013.01); *G01T 1/202* (2013.01); *G01T 1/2018* (2013.01); *G21K 4/00* (2013.01);
(Continued)

(58) Field of Classification Search
CPC .. G21K 4/00; G21K 2004/10; G21K 2004/12; G01T 1/2018; G01T 1/2002
(Continued)

(56) References Cited

U.S. PATENT DOCUMENTS 3,855,035 A 12/1974 Bates, Jr. et al.
6,429,430 B2 * 8/2002 Sato et al. ............... 250/363.01
(Continued)

FOREIGN PATENT DOCUMENTS

CN 101331408 12/2008
CN 102305937 1/2012
(Continued)

OTHER PUBLICATIONS

English-language translation of International Preliminary Report on Patentability (IPRP) dated Jan. 29, 2015 that issued in WO Patent Application No. PCT/JP2013/061491.

*Primary Examiner* — Marcus Taningco
(74) *Attorney, Agent, or Firm* — Drinker Biddle & Reath LLP

(57) ABSTRACT

In a scintillator panel, a glass substrate with the thickness of not more than 150 μm serves as a support body, thereby achieving excellent radiotransparency and flexibility and also relieving a problem of thermal expansion coefficient. Furthermore, in this scintillator panel, an organic resin layer is formed so as to cover a one face side and a side face side of the glass substrate and an organic resin layer is formed so as to cover an other face side and the side face side of the glass substrate on which the organic resin layer is formed. This effectively prevents the edge part from chipping or cracking. Furthermore, stray light can be effectively prevented from entering the side face of the glass substrate and,
(Continued)

the entire surface thereof is covered by the organic resin layers, so that warping of the glass substrate can be suppressed.

12 Claims, 2 Drawing Sheets

(52) U.S. Cl.
CPC ....... *G21K 2004/10* (2013.01); *G21K 2004/12* (2013.01); *Y10T 428/239* (2015.01)

(58) Field of Classification Search
USPC ..................................................... 250/361 R
See application file for complete search history.

(56) References Cited

U.S. PATENT DOCUMENTS

| | | | |
|---|---|---|---|
| 6,469,305 B2 * | 10/2002 | Takabayashi et al. .... | 250/361 R |
| 6,469,307 B2 * | 10/2002 | Takabayashi et al. ... | 250/370.11 |
| 6,573,506 B2 * | 6/2003 | Sato et al. ................ | 250/361 R |
| 6,762,420 B2 * | 7/2004 | Homme et al. ............ | 250/483.1 |
| 7,034,306 B2 * | 4/2006 | Homme et al. ............... | 250/368 |
| 7,164,137 B2 * | 1/2007 | Hayashida ............ | G01T 1/2018 250/370.11 |
| 7,361,901 B1 * | 4/2008 | Gaysinskiy ............... | 250/361 R |
| 7,465,932 B1 * | 12/2008 | Suzuki et al. ........... | 250/370.09 |
| 7,468,514 B1 * | 12/2008 | Suzuki et al. ........... | 250/370.09 |
| 2003/0001101 A1 | 1/2003 | Homme et al. | |
| 2007/0045554 A1 * | 3/2007 | Wakamatsu et al. .... | 250/370.11 |
| 2011/0017911 A1 * | 1/2011 | Flamanc et al. ......... | 250/361 R |
| 2011/0147602 A1 * | 6/2011 | Ishida et al. ........... | 250/370.11 |
| 2011/0204247 A1 * | 8/2011 | Kasai et al. ............. | 250/370.11 |

FOREIGN PATENT DOCUMENTS

| | | |
|---|---|---|
| JP | 2003-262671 A | 9/2003 |
| JP | 2006-058124 A | 3/2006 |
| JP | 2007-279051 A | 10/2007 |
| WO | WO-2008/117821 A1 | 10/2008 |
| WO | WO-2009028275 A1 | 3/2009 |

* cited by examiner

SCINTILLATOR PANEL AND RADIATION DETECTOR

TECHNICAL FIELD

The present invention relates to a scintillator panel and a radiation detector.

BACKGROUND ART

As a conventional scintillator panel there is, for example, the one described in Patent Literature 1. In this conventional configuration, a 0.05-mm glass substrate is used as a support body for a scintillator layer. Furthermore, a buffer to relieve force from the outside of a housing and a high-stiffness member with stiffness higher than that of the scintillator layer are disposed between the housing and the scintillator layer.

In the scintillator panel described in Patent Literature 2, a graphite substrate coated with a polyimide-based resin film or with a poly-para-xylylene film is used as a support body. Furthermore, in the scintillator panel described in Patent Literature 3, the entire surface of the substrate comprised of amorphous carbon or the like is covered by an intermediate film such as a poly-para-xylylene film.

CITATION LIST

Patent Literatures

Patent Literature 1: Japanese Patent Application Laid-open Publication No. 2006-58124
Patent Literature 2: International Publication WO 2009/028275
Patent Literature 3: Japanese Patent Application Laid-open Publication No. 2007-279051

SUMMARY OF INVENTION

Technical Problems

The scintillator panel applied, for example, to a solid-state detector such as a thin-film transistor (TFT) panel is required to have flexibility enough to satisfy shape-following capability to the solid-state detector. In addition, if there is a difference between the coefficient of thermal expansion of the TFT panel and the coefficient of thermal expansion of the substrate of the scintillator panel, fine flaws on the substrate of the scintillator panel or flaws made between the scintillator panel and the TFT panel by abnormally grown portions produced in formation of the scintillator layer by evaporation can transfer to the light receiving surface because of heat during operation, raising a problem that effort of calibration becomes troublesome.

For solving the problem of flexibility and the problem of coefficient of thermal expansion as described above, it is conceivable to use extremely thin glass, e.g., in the thickness of not more than 150 μm as the substrate of the scintillator panel. However, when the extremely thin glass is used, there arises a problem that the end (edge part) of glass is brittle under an impact to chip or crack.

The present invention has been accomplished in order to solve the above problems and it is an object of the present invention to provide a scintillator panel capable of ensuring satisfactory flexibility while preventing the glass substrate from chipping or cracking, and a radiation detector using it.

Solution to Problems

In order to solve the above problems, a scintillator panel according to the present invention comprises: a glass substrate with a thickness of not more than 150 μm having radiotransparency; a first organic resin layer formed so as to cover a one face side and a side face side of the glass substrate; a second organic resin layer formed so as to cover an other face side and the side face side of the glass substrate on which the first organic resin layer is formed; a scintillator layer formed on the one face side of the glass substrate on which the first organic resin layer and the second organic resin layer are formed; and a moisture-resistant protection layer formed so as to cover the scintillator layer along with the glass substrate on which the first organic resin layer and the second organic resin layer are formed.

In this scintillator panel, the glass substrate with the thickness of not more than 150 μm serves as a support body, thereby to achieve excellent radiotransparency and flexibility and also relieve the problem of thermal expansion coefficient. In addition, in this scintillator panel the first organic resin layer is formed so as to cover the one face side and the side face side of the glass substrate and the second organic resin layer is formed so as to cover the other face side and the side face side of the glass substrate on which the first organic resin layer is formed. This makes the glass substrate reinforced by the organic resin layers, whereby the edge part thereof can be effectively prevented from chipping or cracking. Furthermore, stray light can be prevented from entering the side face of the glass substrate and, the entire surface is covered by the first organic resin layer and the second organic resin layer, so that warping of the glass substrate can be suppressed.

Furthermore, preferably, the first organic resin layer contains a white pigment and the second organic resin layer contains a black pigment. In this case, the first organic resin layer is provided with a light reflecting function, thereby achieving radiation characteristics depending upon applications. Furthermore, the second organic resin layer is provided with a light absorbing function, thereby preventing leakage of light and enhancing resolution.

Furthermore, the white pigment may be selected from titanium dioxide, yttrium oxide, zinc oxide, and aluminum oxide and the black pigment may be selected from carbon black or ferrosoferric oxide.

Another scintillator panel according to the present invention comprises: a glass substrate with a thickness of not more than 150 μm having radiotransparency; a first organic resin layer formed so as to cover an other face side and a side face side of the glass substrate; a second organic resin layer formed so as to cover a one face side and the side face side of the glass substrate on which the first organic resin layer is formed; a scintillator layer formed on the one face side of the glass substrate on which the first organic resin layer and the second organic resin layer are formed; and a moisture-resistant protection layer formed so as to cover the scintillator layer along with the glass substrate on which the first organic resin layer and the second organic resin layer are formed.

In this scintillator panel, the glass substrate with the thickness of not more than 150 μm serves as a support body, thereby to achieve excellent radiotransparency and flexibility and also relieve the problem of thermal expansion coefficient. In addition, in this scintillator panel the first organic resin layer is formed so as to cover the other face side and the side face side of the glass substrate and the second organic resin layer is formed so as to cover the one face side and the side face side of the glass substrate on which the first organic resin layer is formed. This makes the glass substrate reinforced by the double organic resin layers, whereby the edge part thereof can be effectively prevented from chipping or cracking. Furthermore, stray light can be prevented from entering the side face of the glass substrate and, the entire surface is covered by the first organic resin layer and the second organic resin layer, so that warping of the glass substrate can be suppressed.

Furthermore, preferably, the first organic resin layer contains a black pigment and the second organic resin layer contains a white pigment. In this case, the first organic resin layer is provided with a light absorbing function, thereby preventing leakage of light and enhancing resolution. Furthermore, the second organic resin layer is provided with a light reflecting function, thereby achieving radiation characteristics depending upon applications.

Furthermore, the white pigment may be selected from titanium dioxide, yttrium oxide, zinc oxide, and aluminum oxide and the black pigment may be selected from carbon black or ferrosoferric oxide.

Furthermore, a radiation detector according to the present invention comprises: the scintillator panel as described above; and a light receiving element arranged opposite to the scintillator layer on which the protection layer is formed.

In this radiation detector, the glass substrate with the thickness of not more than 150 μm serves as a support body of the scintillator panel, thereby to achieve excellent radiotransparency and flexibility and also relieve the problem of thermal expansion coefficient. In addition, in this radiation detector the glass substrate is reinforced by the organic resin layers, whereby the edge part thereof can be effectively prevented from chipping or cracking. Furthermore, stray light can be prevented from entering the side face of the glass substrate and, the entire surface is covered by the first organic resin layer and the second organic resin layer, so that warping of the glass substrate can be suppressed.

Advantageous Effect of Invention

The present invention has made it feasible to ensure satisfactory flexibility while preventing the glass substrate from chipping or cracking.

DESCRIPTION OF EMBODIMENTS

Preferred embodiments of the scintillator panel and the radiation detector according to the present invention will be described below in detail with reference to the drawings.

First Embodiment

Figure 1:
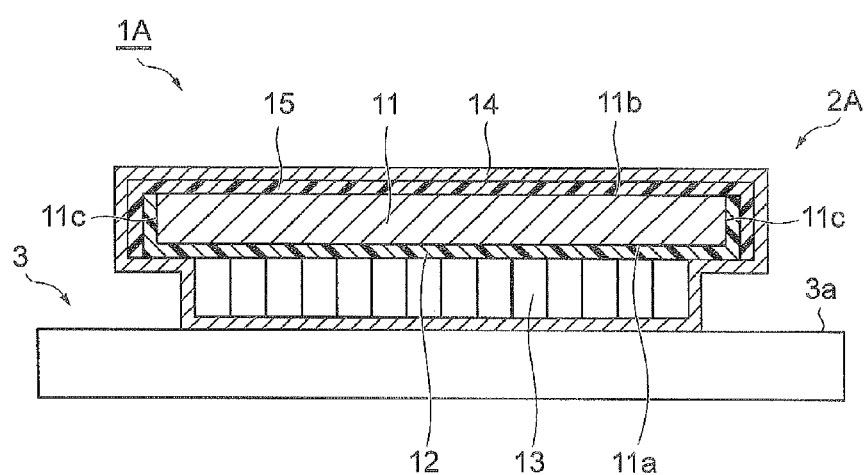
FIG. 1 is a cross-sectional view showing a configuration of a radiation detector according to the first embodiment of the present invention.

FIG. 1 is a cross-sectional view showing a configuration of a radiation detector according to the first embodiment of the present invention. As shown in the same drawing, the radiation detector 1A is constructed by fixing a light receiving element 3 to a scintillator panel 2A. The light receiving element 3 is, for example, a TFT panel in which photodiodes (PD) and thin-film transistors (TFT) are arrayed on a glass substrate.

The light receiving element 3 is stuck on a one face side of the scintillator panel 2A so that a light receiving surface 3a thereof is opposed to a below-described scintillator layer 13 in the scintillator panel 2A. The light receiving element 3 to be also used herein besides the TFT panel can be an element configured so that an image sensor such as CCD is connected through a fiber optic plate (FOP: an optical device composed of a bundle of several-micrometer optical fibers, e.g., J5734 available from Hamamatsu Photonics K.K.).

The scintillator panel 2A is composed of a glass substrate 11 as a support body, an organic resin layer (first organic resin layer) 12 and an organic resin layer (second organic resin layer) 15 to protect the glass substrate 11, a scintillator layer 13 to convert incident radiation to visible light, and a moisture-resistant protection layer 14 to protect the scintillator layer 13 from moisture.

The glass substrate 11 is, for example, an extremely thin substrate having the thickness of not more than 150 μm and preferably having the thickness of not more than 100 μm. Since the glass substrate 11 is extremely thin in thickness, it has sufficient radiotransparency and flexibility and ensures satisfactory shape-following capability of the scintillator panel 2A in sticking it on the light receiving surface 3a of the light receiving element 3.

The organic resin layer 12 and the organic resin layer 15 are formed, for example, by applying silicone resin, urethane resin, epoxy resin, fluorine resin, or the like by the spin coating method or the like. The thicknesses of the organic resin layer 12 and the organic resin layer 15 are, for example, approximately 100 μm.

The organic resin layer 12 is formed so as to cover a one face 11a side and a side face 11e side of the glass substrate 11. On the other hand, the organic resin layer 15 is formed so as to cover the other face 11b side and the side face 11c side of the glass substrate 11 on which the organic resin layer 12 is formed. By this, the glass substrate 11 is in a state in which the one face side 11a is covered by the organic resin layer 12, the other face side 11b is covered by the organic resin layer 15, and the side face side 11c is doubly covered in the order of the organic resin layer 12 and the organic resin layer 15 from the inside. Furthermore, the organic resin layer 12 contains a white pigment, for example, such as titanium dioxide, yttrium oxide, zinc oxide, or aluminum oxide, and the organic resin layer 15 contains a black pigment, for example, such as carbon black or ferrosoferric oxide.

The scintillator layer 13 is formed on the one face 11a side of the glass substrate 11 on which the organic resin layer 12 and the organic resin layer 15 are formed (or it is formed on the organic resin layer 12), for example, by growing and depositing columnar crystals of CsI doped with Tl by the evaporation method. The thickness of the scintillator layer 13 is, for example, 250 μm. The scintillator layer 13 is highly hygroscopic and could deliquesce with moisture in air if kept exposed to air. For this reason, the moisture-resistant protection layer 14 is needed for the scintillator layer 13.

The protection layer 14 is formed, for example, by growing poly-para-xylylene or the like by the vapor phase deposition such as the CVD method, so as to cover the scintillator layer 13 along with the glass substrate 11 on which the organic resin layer 12, 15 is formed. The thickness of the protection layer 14 is, for example, approximately 10 μm.

In the radiation detector 1A having the configuration as described above, radiation incident from the glass substrate 11 side is converted to light in the scintillator layer 13 and the light is detected by the light receiving element 3. Since in the scintillator panel 2A the glass substrate 11 with the thickness of not more than 150 μm serves as a support body, it has excellent radiotransparency and flexibility.

The glass substrate 11 has sufficient flexibility, thereby satisfying the shape-following capability in sticking the scintillator panel 2A to the light receiving surface 3a of the light receiving element 3. Furthermore, when the TFT panel is used as the light receiving element 3 and when the light receiving surface 3a is a glass panel, the coefficient of thermal expansion of the light receiving surface 3a can be made equal to that of the glass substrate 11 of the scintillator panel 2A. This can prevent fine flaws on the glass substrate 11 or flaws made between the scintillator panel and the TFT panel by abnormally grown portions produced during formation of the scintillator layer 13 by evaporation, from transferring to the light receiving surface 3a because of heat during operation, and can also avoid the need for troublesome effort of calibration.

In addition, in this scintillator panel 2A the organic resin layer 12 is formed so as to cover the one face 11a side and the side face 11c side of the glass substrate 11 and the organic resin layer 15 is formed so as to cover the other face 11b side and the side face 11c side of the glass substrate 11 on which the organic resin layer 12 is formed. This makes the glass substrate 11 reinforced by the organic resin layers 12, 15, whereby the edge part thereof can be effectively prevented from chipping or cracking. Furthermore, the side face 11e of the glass substrate 11 is doubly covered by the organic resin layers 12, 15, whereby stray light can be prevented from entering the side face 11c and, the entire surface is covered by the organic resin layer 12 and the organic resin layer 15, so that warping of the glass substrate 11 can be suppressed.

Moreover, since the organic resin layer 12 and the organic resin layer 15 are formed so as to cover the entire surface of the glass substrate 11, it also becomes possible to adjust the surface condition of the glass substrate 11 so as to achieve appropriate surface energy and surface roughness in formation of the scintillator layer 13.

In the scintillator panel 2A, the organic resin layer 12 contains the white pigment and the organic resin layer 15 contains the black pigment. In this case, the organic resin layer 12 is provided with a light reflecting function, thereby achieving radiation characteristics depending upon various applications such as mammography and chest roentgenography, in the scintillator panel 2A. Furthermore, the organic resin layer 15 is provided with a light absorbing function, thereby preventing leakage of light and enhancing resolution.

Second Embodiment

Figure 2:
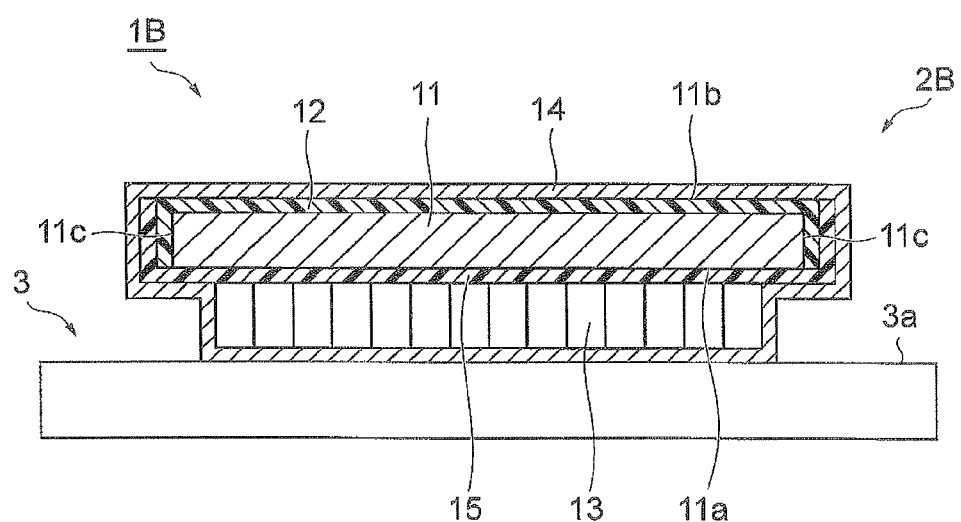
FIG. 2 is a cross-sectional view showing a configuration of a radiation detector according to the second embodiment of the present invention.

FIG. 2 is a cross-sectional view showing a configuration of a radiation detector according to the second embodiment of the present invention. As shown in the same drawing, the radiation detector 1B according to the second embodiment is different from the first embodiment in arrangement locations of the organic resin layer 12 and the organic resin layer 15 in a scintillator panel 2B.

More specifically, the organic resin layer 12 is formed so as to cover the other face 11b side and the side face 11c side of the glass substrate 11. On the other hand, the organic resin layer 15 is formed so as to cover the one face 11a side and the side face 11c side of the glass substrate 11 on which the organic resin layer 12 is formed. By this, the glass substrate 11 is in a state in which the one face side 11a is covered by the organic resin layer 15, the other face side 11b is covered by the organic resin layer 12, and the side face side 11c is doubly covered in the order of the organic resin layer 12 and the organic resin layer 15 from the inside. Furthermore, the organic resin layer 12 contains a black pigment, for example, such as carbon black or ferrosoferric oxide and the organic resin layer 15 contains a white pigment, for example, such as titanium dioxide, yttrium, oxide, zinc oxide, or aluminum oxide.

In this configuration, just as in the above embodiment, the glass substrate 11 is also reinforced by the organic resin layers 12, 15, whereby the edge part thereof can be prevented from chipping or cracking. In addition, stray light can be prevented from entering the side face 11e of the glass substrate 11 and, the organic resin layers 12, 15 are formed over the entire surface, so that warping of the glass substrate 11 can be suppressed. Furthermore, since the organic resin layer 12 containing the black pigment is located inside on the side face 11c of the glass substrate 11, stray light can be more effectively prevented from entering the side face 11c.

REFERENCE SIGNS LIST 1A, 1B radiation detectors; 2A, 2B scintillator panels; 3 light receiving element; 11 glass substrate; 11a one face; 11b other face; 11c side face; 12 organic resin layer (first organic resin layer); 13 scintillator layer; 14 protection layer; 15 organic resin layer (second organic resin layer).

The invention claimed is:

1. A method for manufacturing a scintillator panel comprising:
    forming a first organic resin layer including a light reflecting pigment for a scintillation light on a one face side and a side face side of a glass substrate with a thickness of not more than 150 μm;
    forming a second organic resin layer including a light absorbing pigment for the scintillation light on an other face side and the side face side of the glass substrate; and
    forming a scintillator layer comprising columnar crystals on the first organic resin layer formed on the one face side of the glass substrate;
    forming a moisture-resistant protection layer covering the first organic resin layer, the second organic resin layer, and the scintillator layer;
    the first organic resin layer covering all of the one face and the side face of the glass substrate from the one face side to the side face side; and
    the second organic resin layer covering all of the other face and the side face of the glass substrate from the other face side to the side face side.

2. A method for manufacturing a scintillator panel comprising:
    forming a first organic resin layer including a light absorbing pigment for a scintillation light on an other face side and a side face side of a glass substrate with a thickness of not more than 150 μm;
    forming a second organic resin layer including a light reflecting pigment for the scintillation light on a one face side and the side face side of the glass substrate;
    forming a scintillator layer comprising columnar crystals on the first organic resin layer formed on the one face side of the glass substrate; and forming a moisture-resistant protection layer covering the first organic resin layer, the second organic resin layer, and the scintillator layer;
the first organic resin layer covering all of the other face and the side face of the glass substrate from the other face side to the side face side; and
the second organic resin layer covering all of the one face and the side face of the glass substrate from the one face side to the side face side.

3. A method for manufacturing a scintillator panel according to claim 1, wherein the light reflecting pigment is a white pigment which is selected from titanium dioxide, yttrium oxide, zinc oxide, and aluminum oxide, and the light absorbing pigment is a black pigment which is selected from carbon black or ferrosoferric oxide.

4. A method for manufacturing a scintillator panel according to claim 2, wherein the light absorbing pigment is a black pigment which is selected from carbon black or ferrosoferric oxide, and the light reflecting pigment is a white pigment which is selected from titanium dioxide, yttrium oxide, zinc oxide, and aluminum oxide.

5. A method for manufacturing a radiation detector comprising:
the method of manufacturing the scintillator panel according to claim 1; and
adhering the scintillator panel, such that it shape-follows, to a light receiving face of a TFT panel comprised from arranging a photo diode and TFT on a glass substrate.

6. A method for manufacturing a radiation detector comprising:
the method of manufacturing the scintillator panel according to claim 2; and
adhering the scintillator panel, such that it shape-follows, to a light receiving face of a TFT panel comprised from arranging a photo diode and TFT on a glass substrate.

7. A scintillator panel comprising:
a glass substrate with a thickness of not more than 150 μm having radiotransparency;
a first organic resin layer covering a one face side and a side face side of the glass substrate;
a second organic resin layer covering an other face side and the side face side of the glass substrate on which the first organic resin layer is formed;
a scintillator layer formed on the one face side of the glass substrate on which the first organic resin layer and the second organic resin layer are formed; and
a moisture-resistant protection layer covering the scintillator layer along with the glass substrate on which the first organic resin layer and the second organic resin layer are formed,
wherein the first organic resin layer contains a light reflecting pigment for a scintillation light and wherein the second organic resin layer contains a light absorbing pigment for the scintillation light.

8. The scintillator panel according to claim 7 wherein the light reflecting pigment is a white pigment which is selected from titanium dioxide, yttrium oxide, zinc oxide, and aluminum oxide, and wherein the light absorbing pigment is a black pigment which is selected from carbon black or ferrosoferric oxide.

9. A radiation detector comprising:
the scintillator panel according to claim 7; and
a light receiving element arranged opposite to the scintillator layer on which the protection layer is formed.

10. A scintillator panel comprising:
a glass substrate with a thickness of not more than 150 μm having radiotransparency;
a first organic resin layer covering an other face side and a side face side of the glass substrate;
a second organic resin layer covering a one face side and the side face side of the glass substrate on which the first organic resin layer is formed;
a scintillator layer formed on the one face side of the glass substrate on which the first organic resin layer and the second organic resin layer are formed; and
a moisture-resistant protection layer covering the scintillator layer along with the glass substrate on which the first organic resin layer and the second organic resin layer are formed,
wherein the first organic resin layer contains a light absorbing pigment for a scintillation light and wherein the second organic resin layer contains a light reflecting pigment for the scintillation light.

11. The scintillator panel according to claim 10, wherein the light absorbing pigment is a black pigment which is selected from carbon black or ferrosoferric oxide, and the light reflecting pigment a white pigment which is selected from titanium dioxide, yttrium oxide, zinc oxide, and aluminum oxide.

12. A radiation detector comprising:
the scintillator panel according to claim 11; and
a light receiving element arranged opposite to the scintillator layer on which the protection layer is formed.

* * * * *